E. E. MAGGARD.
MOTION PICTURE FRAMING DEVICE.
APPLICATION FILED DEC. 17, 1913.
1,179,735.
Patented Apr. 18, 1916.
2 SHEETS—SHEET 1.
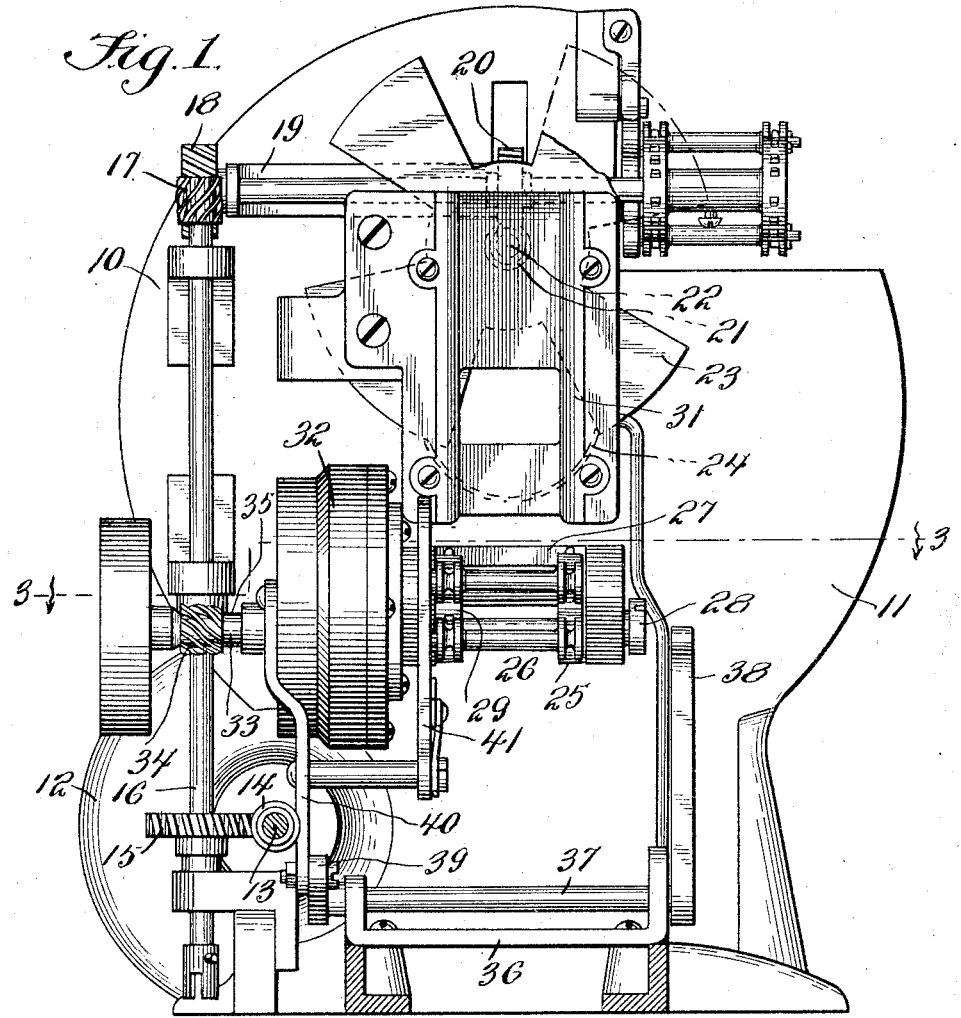
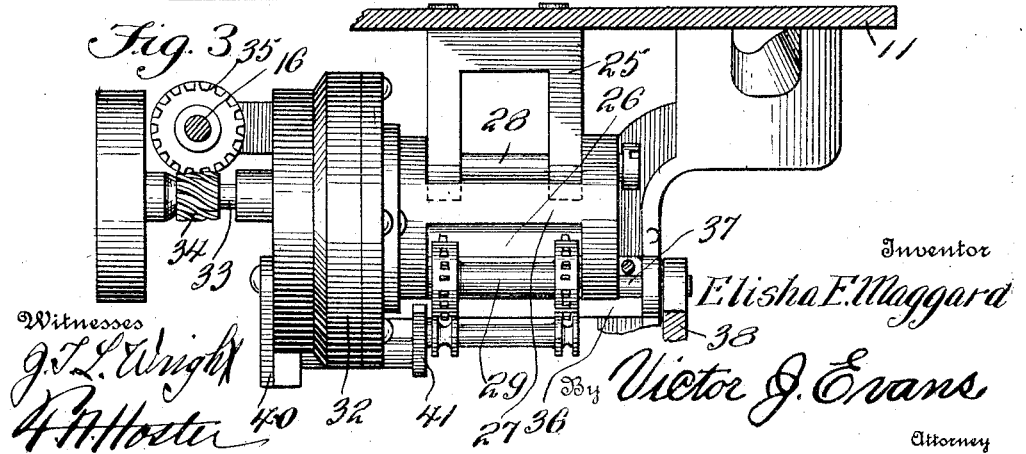
Witnesses
J. L. Wright
A. H. Hoster
Inventor
Elisha E. Maggard
By Victor J. Evans
Attorney

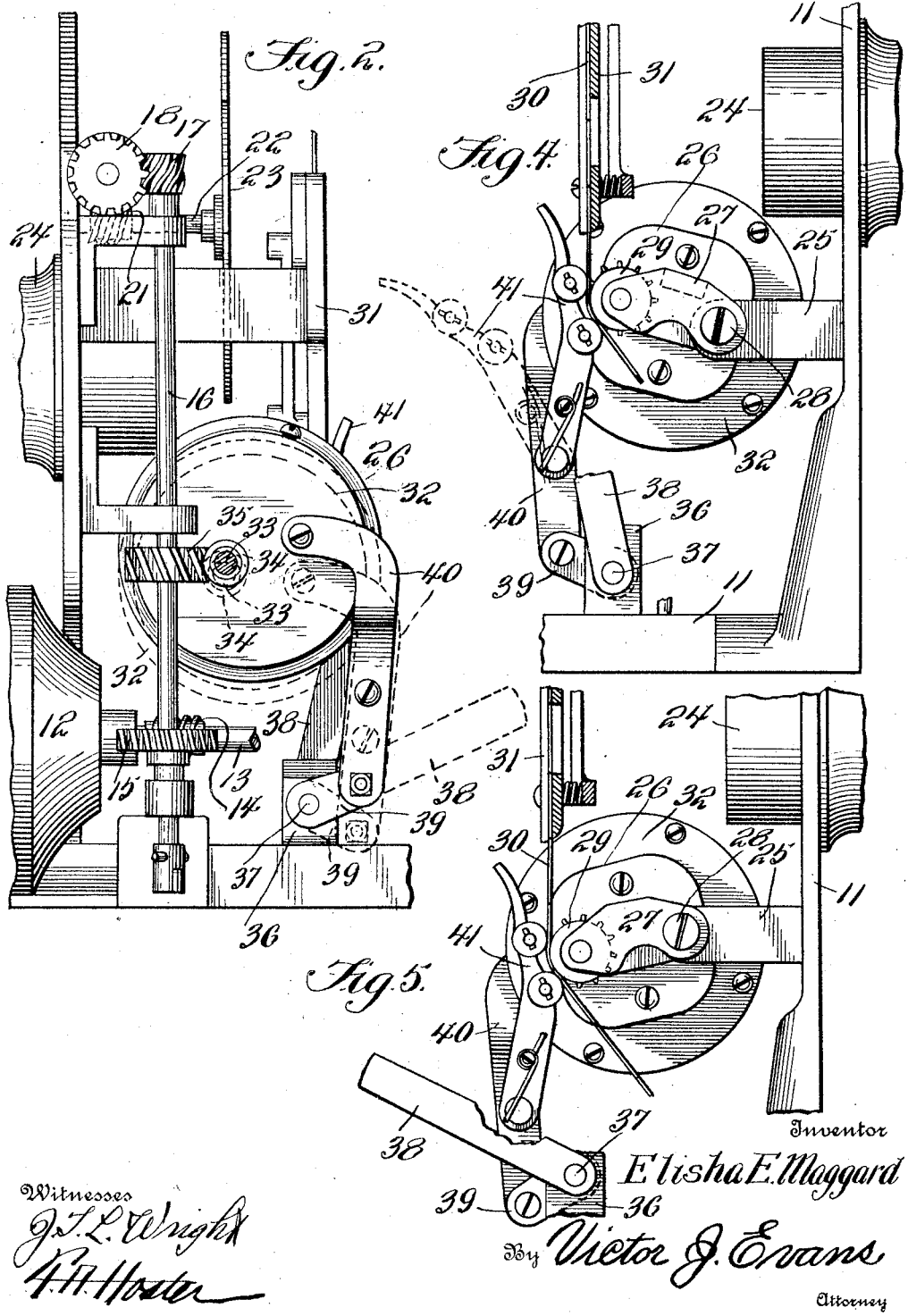

UNITED STATES PATENT OFFICE.

ELISHA E. MAGGARD, OF MOREHEAD, KENTUCKY.

MOTION-PICTURE-FRAMING DEVICE.

1,179,735.  Specification of Letters Patent.  Patented Apr. 18, 1916.

Application filed December 17, 1913. Serial No. 807,316.

*To all whom it may concern:*

Be it known that I, ELISHA E. MAGGARD, a citizen of the United States, residing at Morehead, in the county of Rowan and State of Kentucky, have invented new and useful Improvements in Motion-Picture-Framing Devices, of which the following is a specification.

The invention relates to motion picture machines, and more particularly to framing devices therefor, and has for an object to provide a device for use in conjunction with the motion picture machine whereby the picture on the film to be exhibited can be held and adjusted to aline with the framing aperture during the operation of projecting the pictures upon the screen.

The invention contemplates, among other features, the provision of a framing device, through the medium of which the pictures, as they are thrown upon the screen, will be alined with the source of light and the shutter as well as the objective so that two consecutive images or pictures on the film will not be projected upon the screen at the same time and whereby a single picture on the film, when in exhibiting position, will, in its entirety, be thrown upon the screen.

The invention still further embodies the provision of a framing device of a simple and durable construction which can be easily attended to by the operator and which will not in any manner interfere with the proper operation of the motion picture machine.

Although I am aware that various kinds and forms of framing devices have been used heretofore in connection with motion picture apparatus, I aim in this instance to provide a device which is so arranged and constructed with respect to the body and driving parts of the machine that in the operation of framing the picture the shutter, which is an essential part to the proper projection of the picture and operable by a unitary driving mechanism, will not be displaced from its proper operative position, although the driven member for imparting intermittent motion to the film is operable with the framing device and actuated by the said unitary driving mechanism.

In many of the framing devices heretofore used, the adjustment of the framing device to a position for framing the picture results in displacing the shutter from its proper position, thus preventing a proper exhibition of the images or pictures upon the film and detracting from the appearance of the motion pictures upon the screen, this being due to the fact that the framing device as a rule includes the intermittent motion mechanism as a part thereof, and which intermittent motion mechanism is actuated by the driving unit that imparts rotation to the shutter so that upon actuating the framing device to properly aline the picture with the framing aperture, the connection between the driving member of the intermittent motion mechanism, coöperating with the shafting and gearing to the shutter, tends, during the adjustment of the framing device, to move the shafting and gearing to the shutter and thereby offsetting the shutter from its proper position for cutting out the source of light to the screen at the moment one picture exhibited upon the screen is advanced to expose the next picture.

In the further disclosure of the invention reference is to be had to the accompanying drawings, constituting a part of this specification, in which similar characters of reference denote corresponding parts in all the views, and in which:

Figure 1 is a rear elevation of a motion picture machine showing my device used in connection therewith; Fig. 2 is a side elevation of the machine showing my device; Fig. 3 is a horizontal sectional view taken on the line 3—3 in Fig. 1; Fig. 4 is a fragmentary side elevation showing the framing device in position to frame a picture, the dotted lines indicating the inoperative position of the roller member; and Fig. 5 is a view similar to Fig. 4, showing the position of the framing device after the picture has been framed.

Referring more particularly to the views, I disclose a motion picture machine 10 consisting of the usual frame 11, a motor or other suitable driving unit 12, and a main shaft 13 journaled on the frame to connect with the driving unit 12. The main shaft. carries a worm 14 meshing with a wheel 15 keyed to a vertical shaft 16 and which in this instance I will term the driving member on account of its relation to other parts of the machine to be hereinafter more fully described.

The driving member 16 at its upper end carries a worm 17 meshing with a wheel 18 keyed to a horizontal shaft 19, journaled on the frame 11, and which in turn has keyed thereto a wheel 20 meshing with a worm 21 carried on a horizontal shutter shaft 22 to which is keyed the usual shutter 23 and which is adapted to cut off the usual source of light to the objective 24. Thus it will be apparent that the driving unit 12 in its operation, through the medium of the various shafts and gearing mentioned, will impart rotation to the shutter 23. Projecting from the rear face of the frame 11, and substantially in line with the objective 24, is a bracket 25, on which is mounted to swing a framing member 26, consisting more particularly of a supporting frame 27, through which passes a horizontal pin 28, said pin also passing through the bracket 25 to swingingly support the framing member 26 upon the bracket. Mounted to turn on the supporting frame 27 is a film sprocket wheel 29 which is adapted to be engaged by the usual film 30 for intermittently advancing the film across the usual apertured plate 31 supported on the frame 11 immediately in the rear of the objective 24, the shutter 23 being interposed between the apertured plate and the objective. The framing member 26 further includes a casing 32 and journaled on the casing is a horizontal exteriorly extending shaft 33 which I will preferably term the driven member, the said shaft 33 having a worm 34 keyed thereon and meshing with a wheel 35 carried on the vertical shaft 16 and which I have heretofore designated as the driving member, thus when the driving member is operated imparting rotation to the driven member. By a suitable intermittent motion mechanism (not shown), inclosed in the casing 32, and having connection with the driven member 33, an intermittent movement is imparted to the film sprocket wheel 29 which also extends into the casing 32 for connection with the intermittent motion mechanism. As stated, the casing 32 is rigidly supported on the frame 27 and is thus held against rotation.

Journaled on a U-shaped member 36, secured to the frame 11, is a horizontal shaft 37 having a suitable lever 38 suitably affixed to one end thereof, the other end of the said shaft being provided with a crank 39 having pivotal connection with the lower end of a connecting member 40 which at its upper end is offset and has swinging connection with the casing 32.

In order to properly hold the film in engagement with the sprocket wheel 29 a spring-actuated binding member 41 is mounted to swing upon the connecting member 40 and offset therefrom to lie in the vertical transverse plane of the sprocket wheel 29 so that when the film passes over the sprocket wheel the binding member 41 will hold the film in engagement with the teeth thereof and whereby, when the sprocket wheel is intermittently rotated, the said film will be intermittently advanced across the apertured plate 31. Now referring closely to the views, it will be seen that the point of pivotal connection of the framing member 26 with the frame 11, and which is accomplished through the medium of the pin 28, lies in the horizontal plane of the point of intermeshing of the worm 34 with the wheel 35, this being clearly shown in Figs. 1 and 3. Now when the lever 38 is actuated, it will be apparent that through the medium of the horizontal shaft 37 the crank 39 and the connecting member 40, the framing member 26 will be swung upon the pin 28, thus raising or lowering the sprocket wheel 29 and which, having the film in engagement therewith and prevented from slipping by the teeth of the sprocket wheel, will cause the film to be advanced or retreated relatively to the aperture in the apertured plate 31 in order that the film can be properly alined with the aperture of the apertured plate and thereby be properly alined relatively to the objective. Now if the point of pivotal connection of the framing member with the frame were not in the horizontal plane of the point of engagement of the driving member with the driven member, any movement of the framing member would cause the worm of the driven member to so operate upon the wheel of the driving member with which it intermeshes that a slight movement would be imparted to the driving shaft, and the result of this would be that the shutter, upon alining the film with the objective through the medium of the framing member as mentioned, would be thrown out of its proper position with respect to the film so that upon exhibiting the picture the shutter would not at the proper moment cut off the source of light to the screen and the result would be an imperfect representation of the image on the film when the same is exposed to the source of light and thrown upon the screen. But by having the point of pivotal connection of the framing member in the horizontal plane of the point of engagement of the driven member with the driving member, the worm 34 of the driven member, when the framing member 26 is actuated to adjust the film, will roll upon the wheel 35 of the driving member without imparting the slightest movement to the driving member, and thus it will be apparent that the framing member can be adjusted to any desired position within the limit of its movement without in any manner throwing the shutter out of its proper position. Therefore, by actuating the lever 38 the sprocket wheel 29 can be raised or lowered with the framing member, thus resulting in the film being lowered or raised with respect to the aperture of the apertured plate so that the film can be properly alined with the said aperture without in any way disturbing the position of the shutter.

From the foregoing description it will thus be seen that in the construction set forth any adjustment of the framing member for the purpose of framing an image on the film with the apertured plate will not in any manner disturb the position of the shutter and which is driven from the same source of power employed to accomplish the intermittent motion of the film. Furthermore, by having the connection between the driving member and the driven member mentioned heretofore in the nature of a worm wheel or more particularly in the nature of spiral gears, the rolling of the film upon the wheel in the adjustment of the framing member will not impair the uniform operation of the means employed to impart the intermittent motion to the film, this being due to the fact that the connection between the driving and driven members lies in the horizontal plane of the point of support and swing of the framing member and by means of which construction it will be particularly noted that the contact between the worm of the driven member and the wheel of the driving member is in the nature of a rolling or rocker movement.

Having thus described my invention, I claim:

1. In a motion picture framing device, the combination with the frame of the motion picture machine and an apertured plate on the machine, of a U-shaped bracket fixed to the frame below the plane of the plate, a supporting frame pivotally mounted on the bracket, a film sprocket wheel journaled in said supporting frame and adapted to engage a film, a casing mounted on one side of the supporting frame and having internal intermittent motion mechanism connected directly with the sprocket wheel, a crank pivotally supported on the machine frame, a connecting member eccentrically pivoted to the casing and also pivoted to the crank, driven connection for the intermittent motion mechanism, and means for operating the crank for raising and lowering the casing and a supporting frame connected therewith.

2. In a motion picture framing device, the combination with the frame of the motion picture machine and an apertured plate on the machine, of a U-shaped bracket fixed to the frame below the plane of the plate, a supporting frame pivotally mounted on the bracket, a film sprocket wheel journaled in said supporting frame and adapted to engage a film, a casing mounted on one side of the supporting frame and having internal intermittent motion mechanism connected directly with the sprocket wheel, a crank pivotally supported on the machine frame, a connecting member eccentrically pivoted to the casing and also pivoted to the crank, driven connection for the intermittent motion mechanism, means for operating the crank for raising and lowering the casing and a supporting frame connected therewith, and means for binding the film against the sprocket wheel.

In testimony whereof I affix my signature in presence of two witnesses.

ELISHA E. MAGGARD.

Witnesses:
F. A. HOSTER,
E. EDMONSTON, Jr.

Copies of this patent may be obtained for five cents each, by addressing the "Commissioner of Patents, Washington, D. C."